(No Model.)
G. D'INFREVILLE.
DYNAMO TELEGRAPHY.
No. 265,488. Patented Oct. 3, 1882.
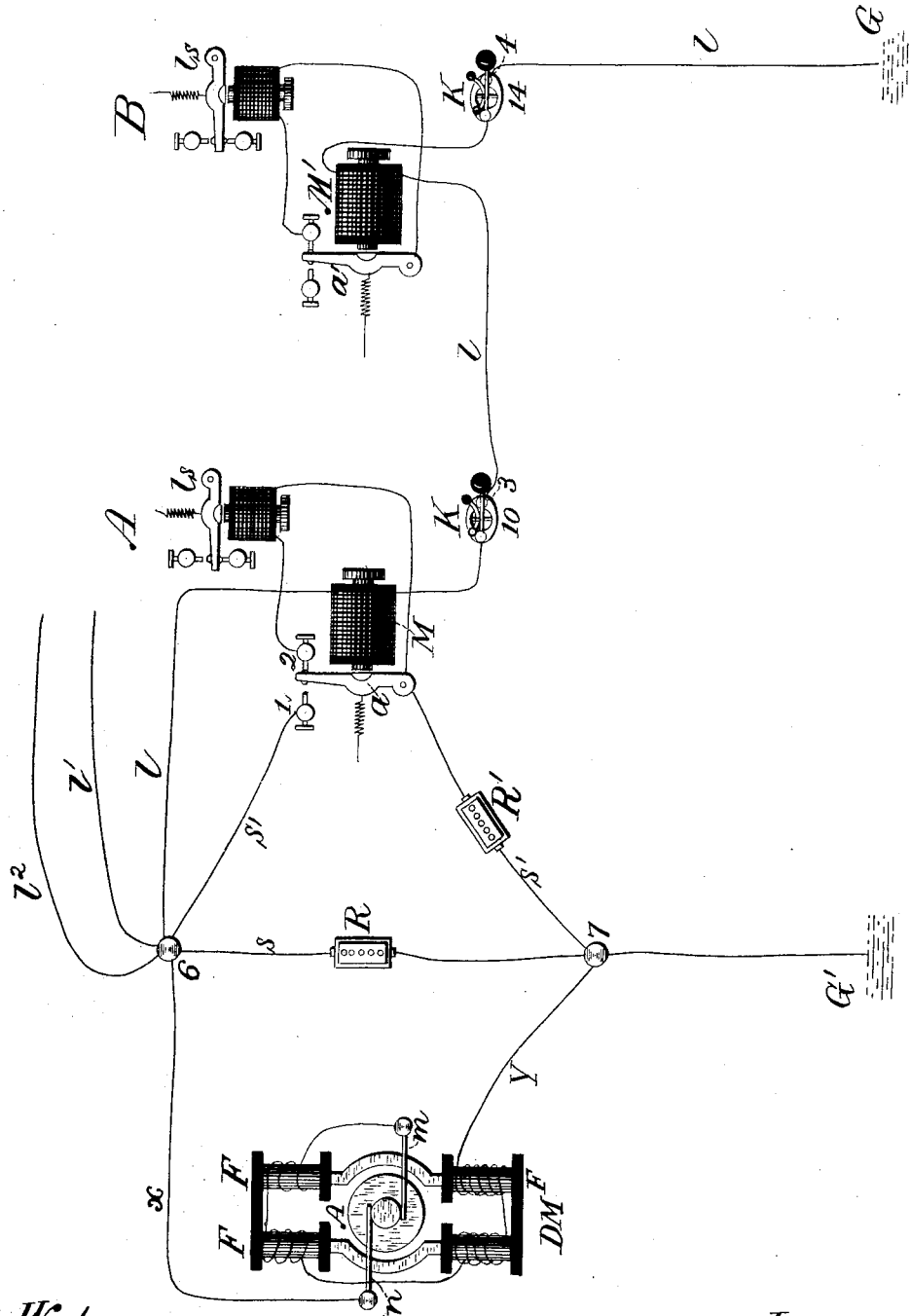
Witnesses:
Wm. Arnoux
W. B. Vannye
Inventor,
Georges d'Infreville
per C. L. Buckingham
Atty.

UNITED STATES PATENT OFFICE.

GEORGES D'INFREVILLE, OF NEW YORK, N. Y., ASSIGNOR TO THE WESTERN UNION TELEGRAPH COMPANY, OF SAME PLACE.

DYNAMO-TELEGRAPHY.

SPECIFICATION forming part of Letters Patent No. 265,488, dated October 3, 1882.

Application filed April 27, 1881. (No model.)

*To all whom it may concern:*

Be it known that I, GEORGES D'INFREVILLE, of the city, county, and State of New York, have made a new and useful improvement in the art of applying dynamo-electric machines for telegraphic purposes, of which the following is a specification, reference being had to the accompanying diagram.

Dynamo-electric machines whose field-magnetism is maintained by the currents generated in their own armatures have heretofore been devised to furnish many telegraph-lines connected to the poles of the machine in multiple arc with electricity by connecting the opposite poles of said dynamo-electric machine with a shunt-conductor of comparatively high resistance, said resistance for ordinary purposes being intermediate in amount between the low internal resistance of the dynamo-machine and the higher joint resistance of the main lines connected to the dynamo-machine in multiple arc.

In the process of sending messages upon normally-closed circuit Morse wires the various telegraph-lines connected in multiple arc are arbitrarily broken and closed, from which fact the joint resistance of the several lines is rendered highly variable. The external resistance of the dynamo-machine consists of the joint resistance of the permanently-closed shunt-conductor and telegraph-lines, wherefore if any telegraph-line of the series is broken the external resistance of the machine is correspondingly increased, while its electromotive force is greatly diminished.

My invention has for its object the maintenance of a practically constant or unvarying external resistance, notwithstanding the arbitrary breaking and closing of the several lines, and to the accomplishment of this end each of the telegraph-lines is supplemented at the dynamo-machine with an additional but normally-open shunt, each shunt, when closed, having a resistance equal to the resistance of its respective line. Each shunt is opened and closed by an electro-magnetic switch controlled by its corresponding main line in such a manner that when a main line is closed and a current is thereon an electro-magnet in the line shall retain the switch to break the shunt provided for such line. However, upon breaking a main-line circuit the electro-magnet controlling its shunt-switch permits the closing of said shunt-conductor. Each telegraph-line practically joins, for the purpose I have in view, the two opposite poles by the dynamo-machine, and each corresponding normally-open shunt-circuit constitutes a parallel branch circuit, when closed, of equal resistance, to join the opposite poles of the dynamo-machine. Therefore, as the shunt-branches are only closed when the corresponding lines are broken, the external resistance of the machine must be the same whether the main lines are broken or closed.

I will now explain my invention by reference to the accompanying diagram.

D M represent a dynamo-machine the helices of whose field-magnets, F, are in circuit with the armature. $m$ and $n$ are brushes of the machine. $x$ and $y$ lead to binding-posts 6 and 7, respectively. Posts 7 and 6 are joined by a constantly-closed shunt-conductor, $s$, having a resistance, R. They are also joined by a series of normally-open shunt-conductors, each of which is of a resistance equal to that of its corresponding telegraph-line. In the diagram only one normally-open shunt, $s'$, is shown. Shunt $s'$ supplements line $l$. $l'$, $l^2$, and other lines should each in like manner be provided with shunt-conductors of the same character. When all of the keys $k\,k$ are closed at stations A B armature $a$ is held to pole of M and against point 2 to give a signal upon local sounder $l\,s$. However, upon breaking the circuit of $l$, either at A or B, armature $a$ will be released and will close, through back contact, 1, and armature $a$, the shunt $s'$. Resistance R' of shunt $s'$ is equal to or less than the resistance of line $l$. If shunt $s'$ were not provided, a break of line $l$ would obviously increase the external resistance of the machine; but as the breaking of $l$ automatically substitutes therefor artificial and parallel branch of equal resistance the external resistance of the machine must remain the same. $l\,s$ represent at each of the stations local sounders, brought to action respectively by relays M and M', having armatures $a$ and $a'$. 3 and 4 are front contact-points of keys $k\,k$, respectively. Connections 10 and 14 each represent any ordinary form of circuit-when the key is not being employed for transmission. The opening and closing of line $l$ by any one of keys $k\,k$ will actuate all of the local sounders on the line, and at the same time effect the closing and opening of shunt $s'$, and thereby maintain a uniform external resistance in respect to the dynamo-machine.

$G'$ represents an earth-connection for one pole of the generator, while $G$ shows an earth-connection for line $l$, connected to the opposite pole.

What I claim, and desire to secure by Letters Patent, is—

1. A dynamo-electric machine for telegraphic purposes, in combination with a main telegraph-line, constituting, when closed, a portion of the external circuit of said dynamo-machine, and a compensating-shunt joining the opposite poles of said machine, whose resistance is approximately equal to the resistance of said main line, as specified.

2. A dynamo-electric machine for telegraphic purposes, in combination with a main telegraph-line, forming a portion of the external circuit of said machine when closed, and a compensating-shunt joining the opposite poles of said machine, whose resistance is approximately equal to that of the main line, and an automatic line is opened and breaks the shunt when the main line is closed, substantially as specified.

3. A dynamo-electric machine for telegraphic purposes, in combination with one or more main telegraph-lines, each forming a portion of the external circuit of the machine, a corresponding number of shunts joining the opposite poles of the machine, an automatic switch for each shunt, operating to open and close the same as the corresponding main telegraph-line is closed and opened, whereby the external resistance of the dynamo-machine, consisting of the main telegraph-lines and shunts joining the opposite poles of the machine, may be maintained practically constant as the said telegraph-lines are arbitrarily opened and closed in the process of sending messages.

4. A dynamo-electric machine for telegraphic purposes, in combination with a telegraph-line fed thereby and a shunt joining the opposite poles of said machine, whose resistance is substantially equal to the resistance of the line, as specified.

GEORGES D'INFREVILLE.

Witnesses:
    WM. ARNOUX,
    W. B. VAUSIZE.